(No Model.)

C. W. SONE.
HARNESS PAD HOOK.

No. 546,034. Patented Sept. 10, 1895.

Inventor
Charles W. Sone.

Witnesses
E. H. Munn
J. R. Owens

By his Attorneys.
C. A. Snow & Co.

UNITED STATES PATENT OFFICE.

CHARLES W. SONE, OF TERRELL, TEXAS.

HARNESS-PAD HOOK.

SPECIFICATION forming part of Letters Patent No. 546,034, dated September 10, 1895.

Application filed August 14, 1894. Serial No. 520,293. (No model.)

*To all whom it may concern:*

Be it known that I, CHARLES W. SONE, a citizen of the United States, residing at Terrell, in the county of Kaufman and State of Texas, have invented a new and useful Harness-Pad Hook, of which the following is a specification.

This invention relates to an improvement in that class of pad-hooks which are provided to secure the pad to the harness, and is particularly adapted for use in connection with gig-saddles and their pads.

The principal object of the invention is to provide a hook which will be capable of adjustment to suit the size of the gig-saddle with which it is used, to the end that the hooks may be manufactured all after the same pattern.

A second object is to provide a hook which will not injure the gig-saddle by scratching or cutting it, and the attainment of this object will be more fully described hereinafter.

A third object is to provide the hook with finger-grasps, whereby it may be more readily applied to the gig-saddle and removed when so desired.

To these various ends the invention consists in hereinafter-described features of construction.

Figure 1:
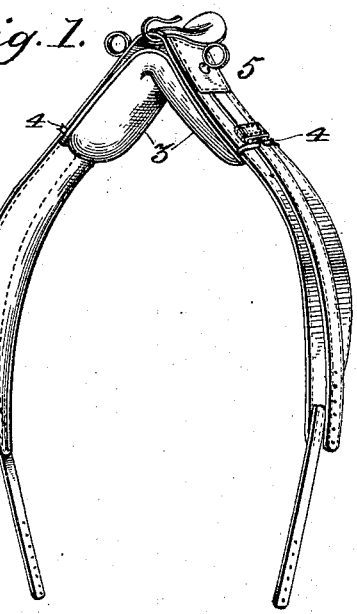
Figure 3:
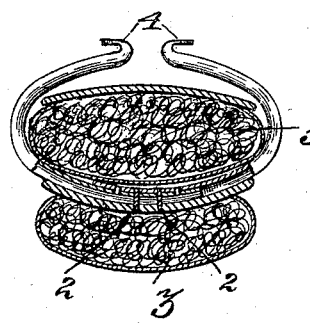
Figure 2:
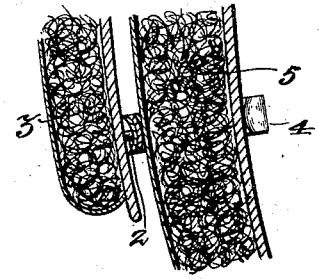
Figure 5:
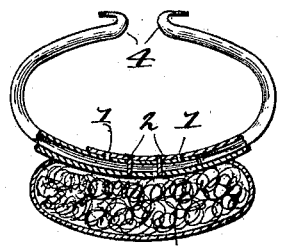
Figure 4:
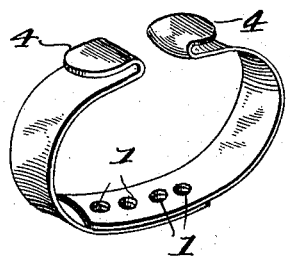
Figure 6:
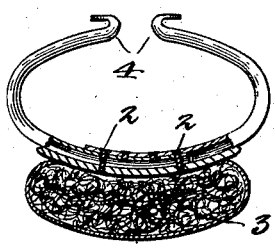

In the accompanying drawings, Figure 1 represents a perspective view of a gig-saddle and pad, showing my improvements in operative relation thereto; Fig. 2, a detail section taken longitudinally with one side of the saddle; Fig. 3, a section taken at right angles with the line of Fig. 2 and through the hook while applied to the saddle and pad; Fig. 4, an enlarged perspective view of the hook, showing it detached from the saddle and pad; Fig. 5, an enlarged detail view showing one manner of joining the sections of the hook and of securing the hook to the pad; Fig. 6, a similar view of a second mode of securing the hook.

The hook is formed of two duplicate sections of plate-steel, having a spring tendency to the normal position and formed in the shape of a semiellipse, so that substantially a complete ellipse will be formed when the sections are assembled. Each section has the material of which it is composed bent or curved so as to form an inner rounded surface and so that the edges of the material will lie beyond the plane of the inner portion, thus placing said edges out of the way of the gig-saddle, or whatever portion of the harness the hook may embrace, and preventing them from cutting the same. The lower end of each section projects beyond the corresponding upper end and is provided with the transversely-aligned holes 1, which are preferably four in number, and which are arranged at equidistant points along the sections, so as to permit their coincidence when the two sections are joined. The sections form a double hook and are concavo-convex in cross-section, with their convex faces inward, whereby the overlapping projecting inner terminals fit snugly together and the inner faces of the sections present smooth surfaces to the harness-saddle. The purpose of these holes is twofold—to permit the adjustment of the sections toward and from each other and the consequent enlargement and contraction of the hook and to permit securing the hook to the pad. Thus, to enlarge the hook, the sections should be so arranged that the two holes at their respective ends will coincide. A rivet, such as 2 in Fig. 5, should now be passed through the said holes and through or into the pad 3, thus securing the hook in place and its sections together. It will be understood that it is immaterial whether the hook be secured to the pad by the same rivet that secures the sections of the hook together or whether separate rivets be used for each purpose. Either plan may be resorted to without departing from the substance of my invention. To reduce the size of the hook the sections should be moved toward each other until two or more of the holes 1 register, whereupon rivets should be passed through said registering holes, which will result in the rigid connection of the two sections, as is understood. The upper ends of the sections of the hook are bent inwardly and slightly downwardly, and have their extremities extended upwardly and rearwardly to form the finger-grips 4. The purpose of these devices is to permit the operator to grasp the ends of the hook and spread them apart against their tendency, so as to allow them to embrace the sides of the gig-saddle 5, as shown in the drawings, and as will be more fully described hereinafter.

In the use of the invention the hook is secured to the pad 6 by means of the rivets 2, so that its upper ends will project outwardly from the pad. As before explained, this securing of the hook may be effected either by means of the same rivets which secure the sections together or by additional rivets. In Fig. 5 the hook is shown secured to the pad by the same rivets which secure its sections, while in Fig. 6 additional rivets are used. After the hooks have been secured to the pad 6 they may be connected with the gig-saddle by spreading apart the ends of the hook, so as to permit them to embrace the respective sides of the saddle, thus securing the pad thereto. By these means the pad is firmly yet removably secured to the saddle by a neat connection.

I have shown the invention as used only with a gig-saddle and pad; but it will be understood that its use is not limited to this particular purpose. The hook may be used to secure any kind of harness-pad in place, and is as well adapted for securing the pads of breast-collars in place as for securing gig-saddle pads.

Having described the invention, I claim—

1. A harness pad hook comprising two similar sections of substantially semi-elliptical shape which unitedly form a device, for the purpose described, of elliptical form, the inner or lower ends of the sections overlapping and being adjustably secured together, whereby the width of the pad hook can be varied to adapt it to different sizes of harness saddles, and the outer or upper ends curving to form finger grips for the purpose described.

2. The herein shown and described harness pad hook, comprising two similar sections of spring metal and of substantially semi-elliptical shape which unitedly form a pad hook of elliptical shape, said sections being convexed between their edges on the inner side and having their inner or lower ends overlapping and provided with a series of registering openings through which extend the fastenings by means of which the sections are held in an adjusted position and to the pad, the outer ends of the said sections terminating in finger grips, substantially as described for the purpose set forth.

In testimony that I claim the foregoing as my own I have hereto affixed my signature in the presence of two witnesses.

CHARLES W. SONE.

Witnesses:
ROBT. L. WARREN,
D. C. CORIKER.